July 15, 1941.  W. E. HUBBARD  2,249,206

RELIEF VALVE

Filed Jan. 24, 1939  2 Sheets-Sheet 1

INVENTOR.
William E. Hubbard
BY Barry + Cyr
ATTORNEYS.

July 15, 1941.  W. E. HUBBARD  2,249,206
RELIEF VALVE
Filed Jan. 24, 1939  2 Sheets-Sheet 2

INVENTOR
*William E. Hubbard*
BY
*Barry & Cyr*
ATTORNEYS

Patented July 15, 1941

2,249,206

UNITED STATES PATENT OFFICE 2,249,206

RELIEF VALVE

William E. Hubbard, Tulsa, Okla., assignor to Hydraulic Pumper Incorporated, Tulsa, Okla., a corporation of Oklahoma Application January 24, 1939, Serial No. 252,686

2 Claims. (Cl. 137—53)

This invention relates to a valve attachment used in conjunction with force pumps, and more particularly but not by way of limitation to an improvement in a relief valve for use with a long stroke hydraulic pump shown in my co-pending application Serial No. 252,032, filed Jan. 20, 1939.

An important object of this invention is to provide a relief valve structure for use with a fluid pump which will automatically allow for free circulation between the discharge and intake sides of the pump in any unbalanced pressure condition of the pump.

And still a further object of this invention is to provide a relief valve structure capable of relieving a distorted pressure condition in a fluid pump, wherein means are provided to automatically relieve the pressure on one side of an active valve head, thereby causing the head to be moved and effecting an equalization of the pump pressures.

And still a further object of this invention is to arrange the parts of a relief valve structure for use with a fluid pump, so that they can be readily disassembled for the purpose of repairs and the like.

Other objects and advantages of my invention will be evident from the following detailed description read in conjunction with the accompanying drawings which illustrate one form of my new invention.

Figure 1:
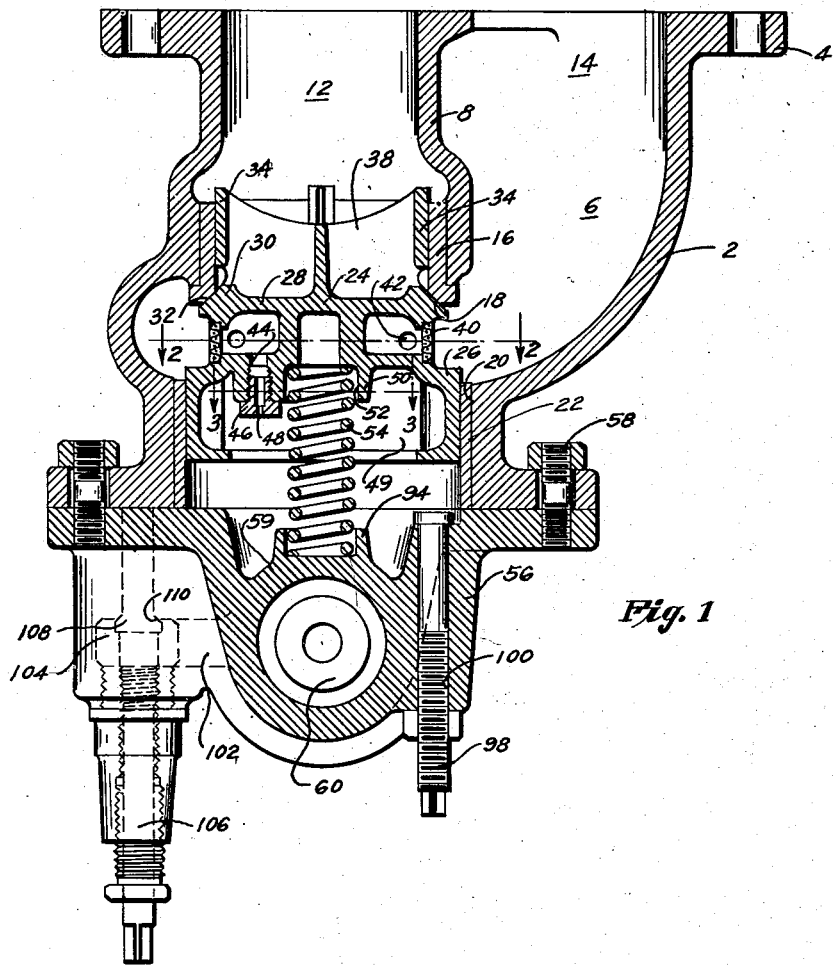
Fig. 1 is a vertical sectional view of my improved relief valve structure taken on line 1—1 of Fig. 5.
Figure 3:
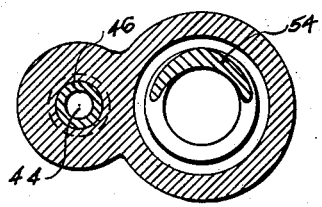
Fig. 3 is an enlarged horizontal sectional view taken on line 3—3 of Fig. 1.

Referring to the drawings in detail and more particularly Fig. 1, the relief valve structure comprises a housing 2 having flanges 4 for securing it to a fluid pump (not shown). The housing is provided with a bore 6 having a partition 8 forming annular chambers 12 and 14. Chamber 12 is in communication with the intake or input side of the fluid pump (not shown) while the chamber 14 is in communication with the discharge side of the pump. An annular bushing 16 (of L-shaped cross section), is pressed into the chamber 12 between the housing 2 and the partition 8. The lower corner of the bushing 16 is inclined to form an annular valve seat 18 for a purpose as will be hereinafter set forth. The housing 2 is provided with a recess 20 communicating with the bore 6 for the reception of a bushing 22 pressed into fitted relationship therewith.

Figure 2:
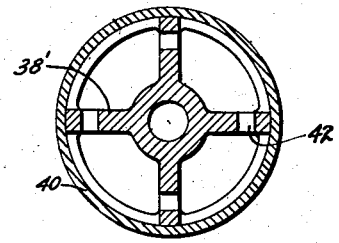
Fig. 2 is a horizontal sectional view taken on line 2—2 of Fig. 1.

An annular valve head 24 is slidably disposed adjacent the bushing 22 and comprises a hollow body portion 26 of substantial rectangular shape in cross section. An angular shaped (in cross section) projection 28 extends from the portion 26 and has enlarged outer periphery 30 provided with an inclined outer face 32 forming the valve face proper, and adapted to contact the seat 18. An annular rim 34 is disposed above the projection 28 and is supported by a plurality of equally spaced vertical ribs 38 integral with and extending from the projection 28. The annular rim functions to guide the head properly in the bushing 16. An annular screen 40 is fixed between the top face of the body 26 and the enlarged periphery 30 of the projection 28. A port or vent 42 is provided in each of the ribs 38' providing communication between the spaces created by the ribs 38' (Fig. 2). A threaded aperture 44 is formed in the top face of the body portion 26 and is in communication with one of the spaces provided by the four ribs 38'. The aperture receives a threaded member 46 (Fig. 1) provided with a central orifice 48 providing communication between the spaced chambers between ribs 38' and the chamber 49 provided by the hollow body 26. The body 26 is provided with an annular depending flange 50, having a recess 52 for the reception of one end of a helical spring 54 as will be hereafter set out.

Figure 4:
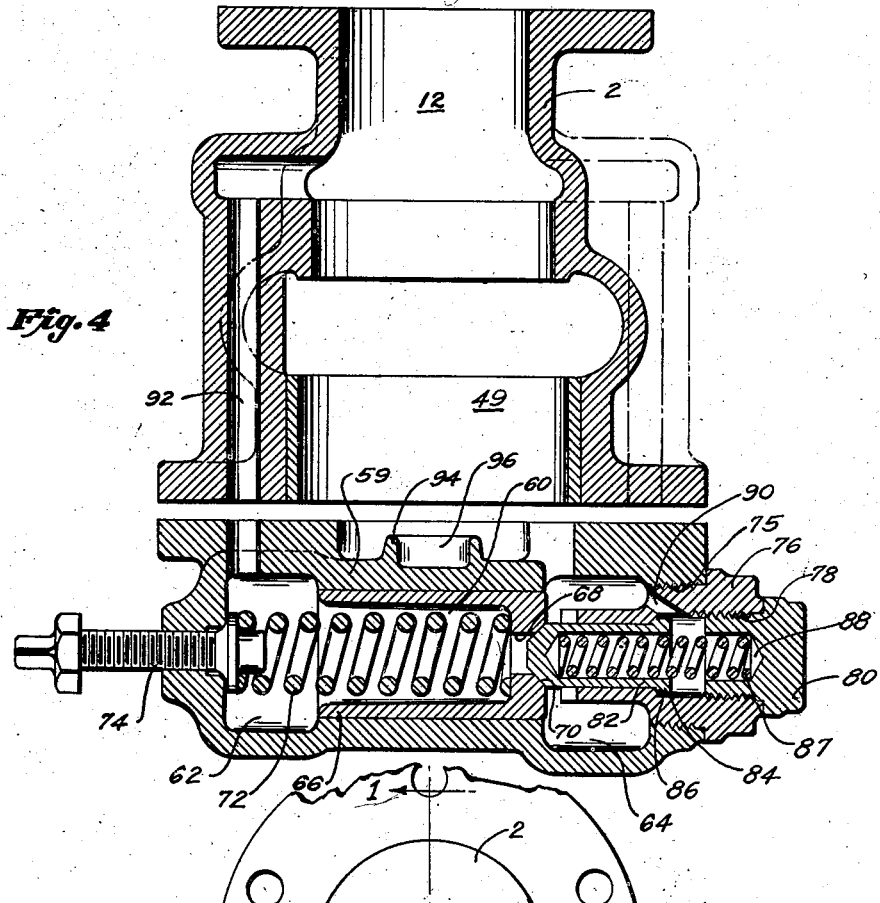
Fig. 4 is a vertical sectional view taken on lines 4—4 of Fig. 5, showing the housings separated.
Figure 5:
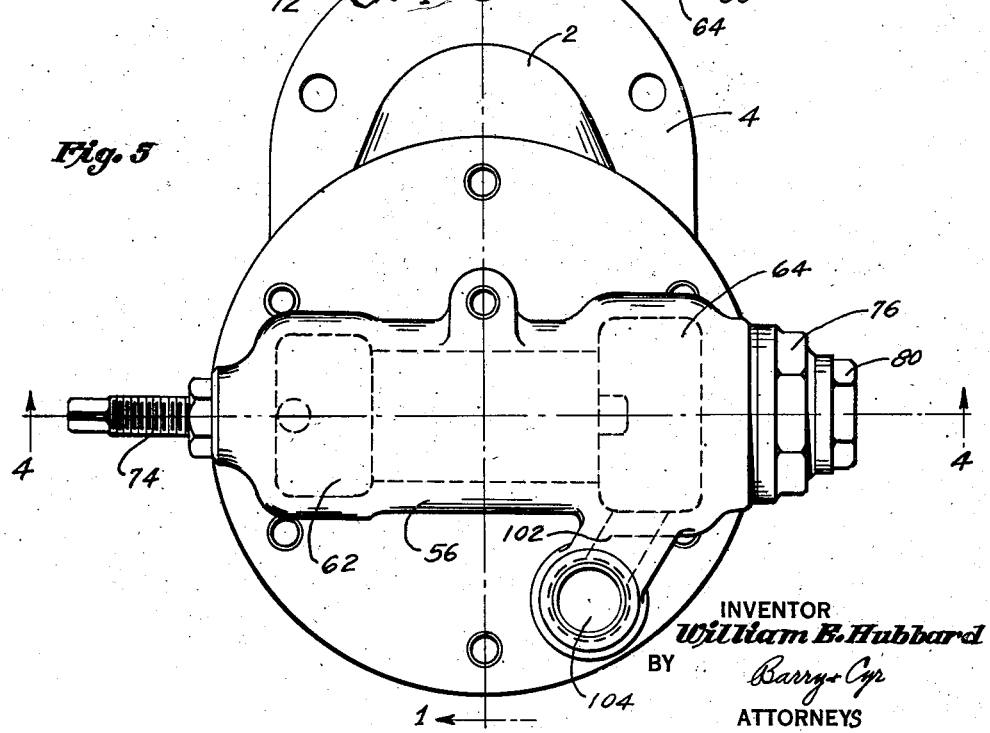
Fig. 5 is a top plan view of my improved relief valve.

A lower housing 56 is secured to the housing 2 by the bolts 58 (Fig. 1), and is provided with a sleeve 59 forming a central bore having oppositely disposed enlarged chambers 62 and 64. The bore of the sleeve 59 is adapted to receive a tubular piston 66 (U-shaped in cross-section) having a port 68 provided with a tapered socket, forming a valve seat 70, in communication with the chamber 64. The hollow piston valve receives a helical spring 72 having one end anchored in the piston and the other end anchored to a threaded plug 74 disposed in one end of the lower housing. The opposite end of the housing 56 has a threaded recess 75 in communication with chamber 64, and receives a plug member 76 having a partially threaded aperture 78 for the reception of a recessed stud 80. The unthreaded portion of the aperture receives an annular pilot valve 82 of substantially U-shaped in cross section, and having a flange 84 adapted to bear against an annular shoulder 86 provided in the aperture 78. The outer end of valve 82 is frusto-conical shaped adapted to cooperate with the tapered socket 70. A helical spring 87 is anchored between the interior of the valve 82 and a recess 88 provided in the stud 80. The plug member 76 has a port 90 providing communication between the chamber 64 and the aperture 78, it being understood that the chamber 64 is in communication with the chamber 49. A conduit 92 (Fig. 4), provides communication between the chamber 62 and the chamber 12.

The sleeve 59 has an annular flange 94 provided with a recess 96 into which one end of the helical spring 54 is anchored.

It will be understood that under normal working conditions fluid pressure is present in the relief valve to act as a solid body. If for any reason the pressure from the discharge side of the pump (not shown) becomes excessive, the fluid flow is increased through the screen 40, ports 42, orifice 48 and as a solid moves the piston 66 against the tension of the spring 72. With the movement of the piston valve 66, it becomes unseated from the pilot valve 82, normally held in seating position due to the tension of the spring 87. With the valve 82 unseated from the seat 70, the fluid passes through the aperture or port 68 into the chamber 60, chamber 62 and up through the conduit 92 into the chamber 12, thus creating a low pressure area in the chamber 49. The low pressure is due to the fact that the amount of fluid passing through the orifice 48 is not as great as the fluid going from chamber 49 through the conduit 92. With the continual discharge of fluid through the by-pass 92, and out of the chamber 49, the discharge pressure in the chamber 14 from the pump acting against the top face of the body portion 26 will move the valve head 24 from its seat 18, allowing the fluid to pass direct from the discharge chamber 14 into the chamber 12.

The direct passage of the fluid from the discharge side to the intake side of the pump (not shown), causes an equalization of the pressures in the pump, and as soon as the pump pressure becomes normal, the tension of spring 72 will move the valve 66 toward the pilot valve 82, immediately sealing off the flow of fluid into the chamber or bore 68 and conduit 92. At the instant of sealing off, the pressure in the chamber 49 will be increased, consequently increasing the fluid pressure flowing through the port 90 to assist the spring 87 in effecting a seating of the pilot valve 82 with the piston socket 70. This increase of pressure in chamber 49 cooperates with the spring 54 to close the valve head 24, and its enlarged portion 30 against the seat 18, thereby allowing the head to assume its normal position and stop the flow of fluid from the chamber 14 to the chamber 12.

In order to limit the opening of the valve head 24, a threaded adjustable stud is disposed in a recess 100 of the housing 56. The stud 98 can be adjusted relative the lower face of the body 26 and thus limit the opening movement of the valve head 24.

In starting the pump used in conjunction with the valve structure, it is often desirous to effect a warming up operation, which would necessitate a free circulation of fluid from the discharge chamber 14 to the intake chamber 12. To effect this operation the valve structure is provided with a port 102 providing communication between the chamber 64 and a conduit 104, communicating with the conduit 92. A threaded stud 106 is disposed in the housing 56 and provided at one end with a frusto-conical auxiliary valve 108, adapted to close against a complementary seat 110, provided in conduit 104, shutting off communication between the chamber 64 and the conduit 92. The valve 108 is normally closed, but in the warming up operation when it is desired to move the head 24 to allow free circulation between the chambers 14 and 12, the valve 108 is unseated by stud 106 to relieve the pressure in the chamber 49 causing the head 24 to move away from its seat 18.

Changes may be made in the combination and arrangement of parts as heretofore set forth in the specification and shown in the drawings, it being understood that any modification in the precise embodiment of the invention may be made within the scope of the following claims without departing from the spirit of the invention.

What I claim is:

1. In a relief valve for use with a fluid pressure pump comprising a housing having a bore forming an inlet and an outlet, a valve head controlling communication between the inlet and outlet, said valve head provided with a plurality of partitions forming a plurality of chambers in communication with the inlet, means provided in each of the partitions allowing passage of fluid between the chambers, means providing communication between one of the chambers and one side of the valve head, and means for relieving fluid pressure on said one side of the valve head.

2. In a relief valve for use with a fluid pressure pump comprising a housing having a bore forming an inlet and an outlet, a valve head controlling communication between the inlet and outlet, said valve head provided with a plurality of partitions forming a plurality of chambers in communication with the inlet, a port provided in each of the partitions allowing passage of fluid between the chambers, an orifice providing communication between one of the chambers and one side of the valve head, and means for relieving fluid pressure on said one side of the valve head.

WILLIAM E. HUBBARD.